(12) United States Patent
Friedrich et al.

(10) Patent No.: US 7,931,745 B2
(45) Date of Patent: *Apr. 26, 2011

(54) BLACK PIGMENT/AUXILIARY COMBINATION HAVING IMPROVED COLOUR STRENGTH

(75) Inventors: Holger Friedrich, Krefeld (DE); Jurgen Kischkewitz, Ratingen (DE); Gerald Buchner, Krefeld (DE)

(73) Assignee: LANXESS Deutschland GmbH, Leverkusen (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/296,209

(22) PCT Filed: Jan. 22, 2007

(86) PCT No.: PCT/EP2007/000496
§ 371 (c)(1),
(2), (4) Date: Oct. 6, 2008

(87) PCT Pub. No.: WO2007/118523
PCT Pub. Date: Oct. 25, 2007

(65) Prior Publication Data
US 2009/0064904 A1 Mar. 12, 2009

(30) Foreign Application Priority Data
Apr. 10, 2006 (DE) .................. 10 2006 017 110

(51) Int. Cl.
*C09C 1/24* (2006.01)
*C09C 3/00* (2006.01)
*C04B 20/00* (2006.01)
*C04B 14/30* (2006.01)

(52) U.S. Cl. ......... 106/460; 106/459; 106/499; 106/712

(58) Field of Classification Search .................. 106/460, 106/476, 712, 459, 499
See application file for complete search history.

(56) References Cited

U.S. PATENT DOCUMENTS

| | | | |
|---|---|---|---|
| 4,946,505 A | | 8/1990 | Jungk |
| 4,966,641 A | | 10/1990 | Westerhaus et al. |
| 5,013,365 A | | 5/1991 | Rademachers et al. |
| 5,059,250 A | | 10/1991 | Burow et al. |
| 5,401,313 A | | 3/1995 | Supplee et al. |
| 5,681,876 A | * | 10/1997 | Schneider et al. ............ 523/351 |
| 5,718,755 A | | 2/1998 | Kohler et al. |
| 5,797,988 A | | 8/1998 | Linde et al. |
| 5,853,476 A | | 12/1998 | Will |
| 5,961,710 A | | 10/1999 | Linde et al. |
| 6,547,870 B1 | * | 4/2003 | Griessmann et al. ......... 106/417 |
| 6,758,893 B2 | * | 7/2004 | McAulay et al. ............. 106/436 |
| 6,803,026 B1 | * | 10/2004 | Linde et al. ................. 423/449.2 |
| 6,824,821 B1 | * | 11/2004 | Gillman et al. ............... 427/212 |
| 7,318,864 B2 | * | 1/2008 | Reisacher et al. ............ 106/499 |

FOREIGN PATENT DOCUMENTS

| | | | |
|---|---|---|---|
| DE | 3632913 A1 | | 3/1988 |
| EP | 1293543 A | * | 3/2003 |
| EP | 1293543 A1 | | 3/2003 |

OTHER PUBLICATIONS

International Search Report from co-pending Application PCT/EP2007/000496 dated Jul. 2, 2007, 4 pages.
Ullmanns Encyclopedia of Industrial Chemistry, 5th Completely Revised Edition, vol. A20, p. 297, (1996).
Ullmanns Encyclopedia of Industrial Chemistry, 5th Completely Revised Edition, vol. A20, p. 309f (1996).
Ullmanns Encyclopedia of Industrial Chemistry, 5th Completely Revised Edition, vol. A5, 140 et seq. (1996).

* cited by examiner

*Primary Examiner* — Anthony J Green
(74) *Attorney, Agent, or Firm* — Nicanor A. Kohncke

(57) ABSTRACT

The present invention relates to a black pigment/auxiliary combination having an improved relative color strength of greater than or equal to 110%, the preparation thereof and the use thereof.

14 Claims, No Drawings

BLACK PIGMENT/AUXILIARY COMBINATION HAVING IMPROVED COLOUR STRENGTH

CROSS REFERENCE TO RELATED PATENT APPLICATIONS

The present application is the 35 U.S.C. §371 national stage application of International Application No. PCT/EP2007/000496, filed 22 Jan. 2007 which was published in German as International Patent Publication No. WO 2007/118523, and is entitled to, and claims, the right of priority under 35 U.S.C. §119 (a)-(d) and (f) of German Patent Application No. 10 Apr. 2006.

The present invention relates to a black pigment/auxiliary combination having improved relative colour strength, the preparation thereof and the use thereof.

Inorganic pigments are encountered in many areas of daily life. They are used, for example, for colouring building materials, such as concrete and asphalt, emulsion paints, finishes and plastics. While as high a chromaticity as possible and as high a colour strength as possible are desired in the case of inorganic coloured pigments, inorganic black pigments have to meet other requirements. Since black pigments are so-called achromatic pigments, high chromaticity is not desired. Thus, for example, the colour of an iron oxide black pigment drifts to red or yellow in the case of an excessively high a* value or b* value, so that the pigment appears brown. In the case of black pigments, high chromaticity is therefore disadvantageous. Nevertheless, as high a colour strength as possible is desired in the case of black pigments.

For colouring concrete products, the pigments are to a large extent used in the pulverulent state. In milled form, they have the advantage of good dispersibility. The complete homogeneous distribution of such pigment powders takes place in the concrete mixer in a short time—up to a few minutes. The disadvantage of these fine powders is that they do not have good flow behaviour and frequently agglomerate and form lumps during storage. Exact metering is complicated thereby. A further disadvantage of some powders is that they tend to form dust.

The prior art describes numerous methods by means of which the colour strength of inorganic pigments is to be improved in order thus to obtain a colour impression which is as optimum as possible in the application medium.

Very frequently, the pigments are also aftertreated after the actual synthesis. Such an aftertreatment may consist, for example, in a thermal treatment at 400° C. to 800° C., as described in EP 0 396 885 B1 or EP 0 249 843 B1 for iron oxide black pigments. The thermal treatment takes place in a weakly oxidizing atmosphere. The examples disclosed in EP 0 396 885 B1 do not however permit any conclusion as to how the tristimulus values and colour strength are influenced by the actual heating step. Moreover, the heated pigment is cooled under inert gas. EP 0 249 843 B1 on the other hand describes a thermal treatment at 200° C. to 800° C. under a nonoxidizing, preferably steam-containing atmosphere for a period of 2 minutes to 5 hours. The colour strength of commercially available iron oxide black pigments may increase by up to 35% as a result. Heating or cooling of the pigments also has to be effected under inert gas. If dried, $Fe_3O_4$ pigment is used as starting material, this process constitutes an additional extremely energy-consumptive process step. Even if the pigment is used as a moist filter cake, this process is very energy-consumptive in the case of long residence times and should therefore be avoided for environmental and climate protection reasons.

Another type of aftertreatment is subsequent coating of the pigments. Thus, DE 35 12 124 A1 describes iron oxide red pigments having improved colouristic properties, the isoelectric point of the pigments being greater than 7, particularly preferably greater than 8. The pigments described according to this teaching must have a coating which consists of colourless compounds of one or more elements from the group consisting of Mg, Zn, Al, La, Y, Zr, Sn, or Ca. Sparingly soluble compounds of Mg, Ca, Al and/or Zn are suitable for the coating and are applied to the pigment by spraying on, application by milling and/or precipitation in the aqueous phase. The process leads to iron oxide red pigments which have a substantially improved colour saturation in finish systems, but the process for the preparation of these iron oxide red pigments is complicated and requires constant monitoring of the isoelectric point. Furthermore, the coating results in a substantial reduction in the colour strength. In DE 36 32 913 A1, this process is extended to include other iron oxide coloured pigments, inter alia, iron oxide black. However, the disadvantages of the process remain the same.

EP 0 634 991 B1 and U.S. Pat. No. 5,401,313 A1 describe surface-modified particles and a process for the preparation thereof. The particles disclosed therein are similar to those from DE 35 12 124 A1 and DE 36 32 913 A1. They differ only through a second coating with at least one dispersion-promoting agent. For example, ligninsulphonates and polyacrylates are mentioned as such. In principle, the preparation of such particles is always a multistage process and therefore even more extensive. One example also discloses an aftertreated iron oxide black pigment which is used for colouring a cement-containing system. The colour strength of this aftertreated iron oxide pigment was measured against an unspecified reference, so that no specific statements can be made about the change in the colour strength as a result of the double coating.

The tendency to form dust and the poor meterability in the case of pigments is frequently counteracted today by granulating these powders before their use. However, a part of the dispersibility is frequently also lost as a result, since the granules are usually enhanced in their stability by binders for improving the transport properties. Consequently, the granules are less readily dispersible in concrete preparations. In the normal, short mixing times customary in the building industry, specs, stripes or colour nests occur on the concrete surface owing to poor pigment distribution. The colour strength present in the pigment cannot be displayed, so that larger amounts of pigment have to be used for the same colour intensity of the concrete workpiece. In spite of the described advantages of pigment granules, the building industry has to a large extent continued to use dry pigment powders.

The prior art describes very many pigment granules or processes for the preparation of pigment granules which are suitable for colouring concrete. Thus, DE 36 19 363 A1 describes a process for colouring concrete, pigment granules which consist of one or more pigments and one or more binders promoting the dispersibility of the pigments in the concrete being used as a colorant. Organic compounds, inter alia lignin sulphonate, are mentioned as binders which act as dispersants in concrete. The colouring effect of these granules in the concrete is comparable in all examples disclosed to that of pigment powders; in any case, it is not significantly better. A disadvantage of the process described is that the dispersion-promoting binders act as plasticizers in concrete mixes. They influence the water/cement ratio and affect the concrete consistency.

Pigment granules which have an acceptable colouring effect on incorporating into concrete can also be prepared using binders which do not promote dispersion. WO 01/74735 A1 describes a process for the preparation of pigment granules starting from a liquid suspension, which is dried. The liquid suspension contains at least one pigment and a binder, the binder being an organic compound which forms an insoluble film after drying or during drying with chemical reaction, the film having no dispersion-promoting effect in the concrete. On incorporation into concrete, the granules prepared are generally compared with other granules which were prepared according to the teaching of DE 36 19 363 A1 and contain dispersion-promoting binders. No significant differences in the colouring behaviour were found.

U.S. Pat. No. 6,758,893 B2 describes a process for the preparation of extruded granules. In the single example disclosed, iron oxide yellow granules are used for colouring a cement-containing system. Although it was the object of the invention to prepare rapidly dispersible granules, a cement sample covered with iron oxide yellow granules is yellower but also substantially less intense in colour than a cement sample covered with iron oxide yellow starting powder. From the published $\Delta L^*$ values, it is possible to conclude that the extruded granules have a colour strength about 10% to 15% lower than that of the iron oxide yellow starting powder used. The disclosed extrusion process therefore gives only granules having a low colour strength.

U.S. Pat. No. 5,853,476 A1 and EP 1 027 302 B1 describe a process for colouring cement-like systems with compacted inorganic pigment granules, the colouring effect of the compacted inorganic granules in the cement-like system surpassing the powder standard. Although the colour measurement in the cement-containing system is described in two examples, the colouring effect of the inorganic compacted pigment granules and of the powder standard being determined with the aid of a colorimeter, no data at all on the tristimulus values and colour strengths are disclosed. In the two examples disclosed, only visual colour matching of the test specimens produced is described. Compared with the powder standard, the test specimens coloured with the inorganic compacted pigment granules are described as being "redder and lighter" in the case of compacted iron oxide red granules or as being "yellower and lighter" in the case of compacted iron oxide yellow granules. According to their own statements, these pigment granules have a lower colour strength than the starting powder ("lighter"). Another disadvantage of the preparation process described for the inorganic compacted pigment granules is the relatively high proportion of more than 3% by weight, based on pigment, of a dispersing agent which simultaneously acts as a binder. A preferably used dispersing agent is lignin sulphonate. However, this acts as a plasticizer in concrete mixes, influences the water-cement ratio and affects the concrete consistency.

DE 198 11 553 A1 discloses a process for the preparation of carbon black granules in which carbon blacks are compacted twice or several times with auxiliaries and comminuted to give granules. According to the process described, not only are readily flowable granules obtained but the relative colour strength of these granules in concrete is higher than would be expected on the basis of the amount of starting material used in powder form. This phenomenon is presumably due to milling of the carbon black and "breaking open" of the carbon black structures during the repeated compacting. This process has the disadvantage that it is technically demanding owing to the double or multiple compacting. Moreover, very high nip forces are applied during the compacting operations, so that precompacting is required in some cases since carbon blacks have as a rule a very low bulk density. Another disadvantage of this process is the large amount of auxiliaries which is necessary in order to produce sufficiently stable granules. In the examples disclosed, up to 12.5% by weight of auxiliaries are added.

DE 195 48 418 A1 describes an afterheating process for iron oxide black granules, in which the iron oxide black granules are heated at temperatures of 80° C. to 650° C. under a slightly reducing, inert or slightly oxidizing atmosphere. The granules were prepared beforehand by spraying or atomisation with the use of soluble phosphates, silicates or sulphates as binders. In the case of the granules too, the heating under inert conditions (nitrogen atmosphere) leads to an increased colour intensity on incorporation into a moistened concrete roof tile mix. This afterheating process has the same disadvantage as already described above in the case of pigment powders: the afterheating step is extremely energy-consumptive. The pigment suspension must first be granulated by evaporating the water, followed by a second process step at very high temperatures. This process is very energy-consumptive and therefore should be avoided for environmental and climate protection reasons.

It was therefore an object of the present invention to provide a black pigment/auxiliary combination which has an improved relative colour strength in the application medium and can be prepared by a simple process in one step with the use of commercially available organic auxiliaries. The added auxiliary or auxiliaries should not lead to any significantly increased chromaticity of the black pigment/auxiliary combination relative to the untreated black pigment.

This object was achieved by a black pigment/auxiliary combination containing one or more inorganic black pigments and one or more organic auxiliaries, the black pigment/auxiliary combination having a relative colour strength of $\geq 110\%$, in particular $\geq 112\%$, based on the black pigment used, according to the building material colour test.

The methods for measuring the tristimulus values and for calculating the relative colour strength are stated in the examples.

The black pigment/auxiliary combination preferably uses iron oxide black, iron-manganese mixed oxide or spinel mixed phase pigments, carbon pigments (carbon black) or mixtures thereof as inorganic black pigments. Examples of iron oxide black pigments are magnetite pigments ($Fe_3O_4$). Iron-manganese mixed oxides $(Mn,Fe)_2O_3$ are also known by the name iron manganese black. Spinel mixed phase pigments are as a rule copper-chromium spinels $CuCr_2O_4$ in which parts of the chromium may also be replaced by iron, for example according to the composition $CuFe_{0.5}Cr_{1.5}O_4$. However, parts of the chromium may be replaced by manganese, according to the composition $Cu(Cr,Mn)_2O_4$. All these compounds are known by the name spinel black.

The black pigment/auxiliary combination preferably uses, as an organic auxiliary, products from the neomere® TINT series from Chryso, partly or completely hydrolysed polyvinyl alcohols, polyvinyl acetate or copolymers with vinyl acetate, such as, for example, the Vinnapas® series from Wacker Polymer Systems GmbH & Co. KG, alkyl sulphates, alkyl sulphonates, alkyl phosphates and alkyl phosphonates in the form of their alkali metal salts, or mixtures thereof. Partly hydrolysed polyvinyl alcohols may be theoretically considered to be a copolymer of vinyl alcohol with vinyl acetate.

In the case of the black pigment/auxiliary combination, preferably the organic auxiliaries are used in an amount of 0.01% by weight to 20% by weight, preferably of 0.1% by weight to 5%, by weight, calculated in each case as active substance, based on the inorganic black pigment(s). Since the organic auxiliaries are often used not as a solid but in the form of solutions, such as suspensions or emulsions, the above data are understood as being based on the active substance.

The black pigment/auxiliary combination preferably contains further processibility-promoting auxiliaries. In the context of this invention, emulsifiers, wetting agents, dispersants, flow improvers, disintegrants or granule binders are also considered to be further processibility-promoting auxiliaries.

The black pigment/auxiliary combination preferably has a residual water content of less than 5% by weight, preferably less than 3% by weight. This can optionally be achieved by subsequent drying. The method for determining the residual water content is stated in the examples.

The black pigment/auxiliary combination is preferably present in granular form. In the context of the invention, "granules" are understood as meaning any material whose mean particle size has been enlarged in comparison with the starting materials by a treatment step. "Granules" therefore includes not only spray granules and compacted granules but also, for example, products of a wet or moist treatment with subsequent comminution, and products of dry or substantially dry processing steps, for example granules, briquettes and the like prepared under dry conditions.

The pigment/auxiliary combination is preferably present in the form of bead granules. Bead granules can be obtained, for example, by spray granulation (spray drying using a disc or nozzle) by the cocurrent or countercurrent method.

At least 85% of the granulated pigment/auxiliary combination preferably has a particle size between 60 μm and 3000 μm, preferably between 80 μm and 1500 μm.

The pigment/auxiliary combination preferably additionally contains preservatives, antifoams, retention agents, rheology modifiers, antisettling agents and/or fragrances.

The invention also comprises a process for the preparation of a pigment/auxiliary combination, characterized in that one or more inorganic black pigments are mixed with one or more organic auxiliaries and the mixture is optionally dried and/or milled.

An advantage of the preparation process according to the invention is that precipitation of an aftertreatment substance or even a multistage synthesis process for the aftertreatment is not required in the preparation of the black pigment/auxiliary combination according to the invention.

The preparation of iron oxide black pigments is described in the literature. They are obtainable by many processes. Iron oxide black pigments are produced on an industrial scale mainly by two processes (Ullmann's Encyclopedia of Industrial Chemistry, Fifth Completely Revised Edition, VCH Verlagsgesellschaft mbH, Weinheim, Vol. A20, Page 297 (1996): the precipitation process, in which iron(II) salt solutions are precipitated with alkalis while passing in air at about 90° C. in the vicinity of the neutral point until the desired Fe(III)/Fe(II) ratio is reached, and the Laux process, in which nitrobenzene is reduced with metallic iron to aniline and which can be controlled so that iron oxide black pigments form. For the preparation of the carbon pigments (carbon blacks), reference is made to Ullmann's Encyclopedia of Industrial Chemistry, Fifth Completely Revised Edition, VCH Verlagsgesellschaft mbH, Weinheim, Vol. A5, page 140 et seq. (1996). The preparation of iron-manganese mixed oxides and spinel mixed-phase pigments is described in Ullmann's Encyclopedia of Industrial Chemistry, Fifth Completely Revised Edition, VCH Verlagsgesellschaft mbH, Weinheim, Vol. A20, Page 309 f. (1996).

The preparation of the black pigment/auxiliary combination according to the invention can be effected either starting from dry pigment or in the wet phase (suspension or paste).

In the first case, one or more black pigments are mixed with one or more organic auxiliaries and the mixture is optionally milled. All mixtures known to the person skilled in the art can be used for mixing pigment and auxiliary. Depending on the mixing unit used, it may in certain circumstances also be advantageous in this procedure to include a downstream mill in order to obtain a complete and homogeneous black pigment/auxiliary combination.

The inorganic black pigment or pigments present in suspension or paste is or are preferably mixed with one or more organic auxiliaries, dried and optionally milled. In the case of the preparation for either wet phase (suspension or paste), the auxiliary or auxiliaries can be added after the actual pigment synthesis in virtually any process step for working up and further processing the pigment up to a final packaging, for example after the filtration and washing of the pigment and before the drying thereof.

The black pigment suspension or paste is preferably a suspension from the pigment preparation process. The addition of the auxiliary in the wet phase is particularly preferred since the addition and the mixing in of the auxiliary or auxiliaries is possible without problems in the suspension.

The black pigment suspension is preferably a redispersion of agglomerated particles. The redispersion of already agglomerated particles is also conceivable in order to prepare a pigment suspension for conversion with the organic auxiliary or auxiliaries starting from pigment powder in a targeted manner. Drying is then effected. A number of units is available to the person skilled in the art for the drying step. Only tunnel, belt, rack, drum, tumbler, tubular and paddle dryers or discontinuously operating chamber dryers will be mentioned at this point. The drying is preferably effected by spray drying or fluidized-bed drying. Spray dryers (atomization dryers) which operate with spray discs or nozzles by the cocurrent or countercurrent method are preferably used.

Depending on the drying unit chosen, it may be necessary for a milling step to follow. Before or after the milling, an additional heating step may also be carried out.

It is not important to the invention whether the combination of black pigment and auxiliary is present in powder form or in granulated form. If the black pigment/auxiliary combination is to be prepared in granulated form, the customary processes are suitable for this purpose. According to the prior art, spray granulation (spray drying by means of a disc or nozzle) by the cocurrent or countercurrent method, pelletizing (mixer, fluidized-bed granulator, pan or drum), compacting or extrusion methods are suitable as preparation processes for pigment granules. Of course, combinations of these granulation processes are also conceivable. The choice of the suitable granulation process depends, inter alia, on whether the auxiliary was added in the wet phase (suspension or paste) or to the already dried black pigment. The spray drying or extrusion process is possible in the first case and the compacting process in the second case.

The black pigment/auxiliary combination is then also subjected to a granulation process, preferably in the dry and optionally milled state.

The invention also comprises the use of the black pigment/auxiliary combination for colouring lime- and/or cement-bound building materials, preferably concrete, cement mortar, render and lime sand brick, or for colouring asphalt. In principle, however, the pigment/auxiliary combination prepared according to the invention is also suitable for colouring finishes, emulsion paints and plastics.

The black pigment/auxiliary combination is preferably mixed with the building materials in an amount of 0.1 to 10% by weight, based on cement or, in the case of asphalt, based on the total mixed material.

The black pigment/auxiliary combination is preferably first suspended in water and then mixed with the building materials.

The subject of the present invention arises not only out of the subject of the individual patent claims but also out of the combination of the individual patent claims with one another. The same applies to all parameters disclosed in the description and to any desired combinations thereof.

The invention is explained in more detail with reference to the following examples, without there being any intention to limit the invention thereby. The amounts stated in % by weight are based in each case on the pigment used.

The present invention has been described with reference to specific details of particular embodiments thereof. It is not intended that such details be regarded as limitations upon the scope of the invention except insofar as and to the extent that they are included in the accompanying claims.

EXAMPLES

I. Description of Methods of Measurement Used

I.1 Building Material Colour Test

The testing of the tristimulus value in building materials was effected in cement mortar by means of the colorimetric measurement of prisms produced with white cement, with the following data (based on DIN EN 12878: 2005, Section 5.12):

Cement/quartz sand ratio 1:4, water/cement value 0.35, level of pigmenting 1.2%, based on cement, mixer used from RK Toni Technik, Berlin, with 51 mixing bowl, design 1551, speed 140 rpm, batch: 1200 g of 0.1 to 1 mm quartz sand, 600 g of 1 to 2 mm quartz sand, 200 g of powdered limestone (<5% sieve residue on 90 μm sieve), 500 g of white cement. The quartz sand fraction and the powdered limestone are initially introduced together into the mixing container. Thereafter, the pigment is added and is pre-mixed for 10 s (mixer speed 1:slow). The water is now added to this mixture, it being necessary to ensure that it is introduced into the middle of the mixture. After infiltration, the cement is added/mixed (mixer speed 1:slow). After a mixing time of 100 s, a sample (600 g) is taken and a test specimen (10×10×2.5 cm) is produced therefrom under pressure (compressive force 114 kN for 2 seconds). Hardening of the test specimens to give the final brick: 24 hours, 30° C. and 95% relative humidity with subsequent drying for 4 hours at 60° C. Colour data measurement using Dataflash 2000 Datacolor International, four measuring points per brick (measuring geometry d/8°, illuminant C/2° with specular component included). The mean values obtained are compared with the values of a reference sample (reference). The chromaticity difference $\Delta C_{ab}^*$ and the relative colour strength (reference sample=100%) (DIN 5033, DIN 6174) are assessed. If the reference sample has a tristimulus value (lightness) Y<10, corresponding to an absolute L* value of <37.84, calculated according to the formula $$L^* = 116 \cdot (Y/100)^{1/3} - 16,$$

the test specimens produced should be discarded and the building material colour test should be modified so that the level of pigmenting is halved to 0.6%, based on cement.

In the context of this application, the following colorimetric abbreviations and calculations, as are known from the CIELAB system, are used:

a* corresponds to the red-green axis with $\Delta a^* = a^*$ (sample)$-a^*$ (reference)

b* corresponds to the yellow-blue axis with $\Delta b^* = b^*$ (sample)$-b^*$ (reference)

$C_{ab}^*$ corresponds to the chromaticity, where $(C_{ab}^*)^2 = (a^*)^2 + (b^*)^2$ $\Delta C_{ab}^*$ corresponds to the chromaticity difference with $\Delta C_{ab}^* = C_{ab}^*$ (sample)$-C_{ab}^*$ (reference)

L* corresponds to the lightness with $\Delta L^* = L^*$ (sample)$-L^*$ (reference)

$\Delta E_{ab}^*$ corresponds to the total colour difference, where $(\Delta E_{ab}^*)^2 = (\Delta L^*)^2 + (\Delta a^*)^2 + (\Delta b^*)^2$.

I.2 Relative Colour Strength

The following equations are applicable for the relative colour strength in %:

$$\text{Relative colour strength in \%} = \frac{(K/S)_{sample}}{(K/S)_{reference}} \cdot 100$$

$$K/S = \frac{(1-\beta^*)^2}{2 \cdot \beta^*}$$

$$\beta^* = \frac{Y/100 - r_0}{1 - r_0 - r_2 \cdot (1 - Y/100)},$$

where $r_0 = 0.04$ and $r_2 = 0.6$ and Y is the tristimulus value (lightness).

The calculation is effected on the basis of DIN 53 234.

I.3 Bulk Density

The bulk density is determined for the finished material without further treatment of the product and by the ratio of mass to volume.

I.4 Residual Moisture

The residual moisture was determined by gentle drying of the pigment/auxiliary combination to constant weight.

I.6 Solidification Behaviour

The solidification behaviour was determined on the basis of DIN EN 196-3. The beginning of solidification and the end of solidification of a cement paste with and without pigmenting are compared with one another, it not being permitted for the deviations to be greater than specified in EN 12878.

I.7 Compressive Strength

The compressive strength was determined on the basis of DIN EN 196-1. The compressive strength of the pigmented cement mortar is tested in comparison with an unpigmented sample, it not being permitted for deviations to be greater than specified in EN 12878 "Pigments for colouring lime- and/or cement-bound building materials" (maximum −8% for reinforced concrete).

II. Example 1

3 kg of iron oxide black Bayferrox® 360 (commercial product from Lanxess Deutschland GmbH) were thoroughly mixed in a mixer with a) 2.5% by weight of neomere® TINT 317 (commercial product from Chryso, SAS) or b) 3.0% by weight of neomere® TINT 308 and 3.0% by weight of a 25% strength aqueous solution or partly hydrolysed polyvinyl alcohol having a low molecular weight and then homogenized using a Bauermeister mill with a 3 mm screen insert. The products obtained were incorporated as described above according to the building material colour test with a mixing time of 100 s. The bricks produced were homogeneously coloured and, in the colour measurement, given a relative colour strength of 129% and 135%, respectively. The reference used was a likewise homogeneously coloured brick of Bayferrox® 360 starting material without additives, which had likewise been milled using the Bauermeister mill with a 3 mm screen insert. The black pigment/auxiliary combinations therefore have a substantially higher colour strength than the starting material. Further details are summarized in Table 1.

III. Example 2

40 kg of Bayferrox® 360 were suspended in 26.7 kg of water and with
a) 1.5% by weight of a 40% strength aqueous solution of sodium polyacrylate and 2.0% by weight of a 25% strength aqueous solution of a partly hydrolysed polyvinyl alcohol having a low molecular weight or
b) 1.5% by weight of neomere® TINT 317 and 2.0% by weight of a 25% strength aqueous solution of a partly hydrolysed polyvinyl alcohol having a low molecular weight.

The suspensions have a solids content of 59% and 57%, respectively, and a pH of 9.1 and 8.8, respectively, and were dried on a nozzle spray dryer. The granules obtained are free-flowing and were incorporated as described above according to the building material colour test with a mixing time of 100 s. The bricks produced were homogeneously coloured and, in the colour measurement, gave a relative colour strength of 120% and 127%, respectively. The reference used was the likewise homogeneously coloured brick of Bayferrox® 360 starting material without additives. The black pigment/auxiliary combinations have a substantially higher colour strength than the starting material. Further details are summarized in Table 1.

IV. Example 3 (Comparative Example)

40 kg of Bayferrox® 360 were suspended in 26.7 kg of water and with 2.5% by weight of a 40% strength aqueous solution of sodium polyacrylate. The suspension had a solids content of 59% and a pH of 8.6 and was dried on a nozzle spray dryer. The granules obtained are free-flowing and were incorporated as described above according to the building material colour test with a mixing time of 100 s. The brick produced was homogeneously coloured and, in the colour measurement, gave a relative colour strength of 99%. The reference used was the likewise homogeneously coloured brick of Bayferrox® 360 starting material without additives. The comparative granules have just a high a colour strength as the starting material. Further details are summarized in Table 1.

V. Example 4 (Comparative Example)

25 kg of Bayferrox® 360 were suspended in 21.2 kg of water and with 3.77% by weight of ammonium lignin sulphonate. The suspension had a solids content of 54.0% and a pH of 5.3 and was dried on a nozzle spray dyer. The granules obtained are free-flowing and were incorporated as described above according to the building material colour test with a mixing time of 100 s. The brick produced was homogeneously coloured and, in the colour measurement, gave a relative colour strength of 105%. The reference used was the likewise homogeneously coloured test specimen of Bayferrox® 360 starting material without additives. The comparative granules have only a slightly higher colour strength than the starting material. Further details are summarized in Table 1.

VI. Example 5

3 kg of iron-manganese mixed oxide Bayferrox® 303T (commercial product from Lanxess Deutschland GmbH) were thoroughly mixed in a mixer with 1.5% by weight of neomere® TINT 305 and 1.5% by weight of a 25% strength aqueous solution of a partially hydrolysed polyvinyl alcohol having a low molecular weight and then homogenized using a Bauermeister mill with a 3 mm screen insert. The product obtained was incorporated as above according to the building material colour test with a mixing time of 100 s. The brick produced was homogeneously coloured and, in the colour measurement, gave a relative colour strength of 112%. The reference used was the likewise homogeneously coloured brick of Bayferrox® 303T starting material without additives, which had likewise been milled using the Bauermeister mill with a 3 mm screen insert. The black pigment/auxiliary combination therefore has a substantially higher colour strength than the starting material. Further details are summarized in Table 1.

VII. Example 6

25 kg of iron-manganese mixed oxide Bayferrox® 303T were suspended in 18.5 kg of water and 3.0% by weight of a 25% strength aqueous solution of a partly hydrolysed polyvinyl alcohol having a low molecular weight. The suspension had a solids content of 55% and a pH of 8.2 and was dried on a nozzle spray dryer. The granules obtained are free-flowing and were incorporated as described above according to the building material colour test with a mixing time of 100 s. The brick produced was homogeneously coloured and, in the colour measurement, gave a relative colour strength of 123%. The reference used was a likewise homogeneously coloured brick of Bayferrox® 303T starting material without additives. The black pigment/auxiliary combination therefore has a substantially higher colour strength than the starting material. Further details are summarized in Table 1.

VII. Example 7

2 kg of copper-chromium spinel Heucodur-Schwarz® 963 (commercial product from Heubach GmbH) were thoroughly mixed in a mixer with
a) 2.5% by weight of neomere® TINT 317 or
b) 2.5% by weight of neomere® TINT 305
and then homogenized using a Bauermeister mill with a 3 mm screen insert. The products obtained were incorporated as described above according to the building material colour test with a mixing time of 100 s. The bricks produced were homogeneously coloured and, in the colour measurement, gave a relative colour strength of 142% and 135%, respectively. The reference used was the likewise homogeneously coloured brick of Heucodur-Schwarz® 963 starting material without additives, which had likewise been milled using the Bauermeister mill with 3 mm screen insert. The black pigment/auxiliary combinations therefore have a substantially higher colour strength than the starting material. Further details are summarized in Table 1.

IX. Example 8

20 kg of copper-chromium spinel Heucodur-Schwarz® 963 were suspended in 20 kg of water and with
a) 1.5% by weight of neomere® TINT 317 and 2.0% by weight of a 25% strength aqueous solution of a partly hydrolysed polyvinyl alcohol having a low molecular weight b) 1.5% by weight of neomere® TINT 305 and 2.0% by weight of a 20% strength aqueous solution of a partly hydrolysed polyvinyl alcohol having a higher molecular weight.

The suspensions had a solids content of 50% and a pH of 6.9 and 5.5, respectively, and were dried on a nozzle spray dryer. The granules obtained are free-flowing and were incorporated as described above according to the building material colour test with a mixing time of 100 s. The bricks produced were homogeneously coloured and, in the colour measurement, gave a relative colour strength of 134% and 126%, respectively. The reference used was the likewise homogeneously coloured brick of Heucodur-Schwarz® 963 starting material without additives. The black pigment/auxiliary combinations have a substantially higher colour strength than the starting material. Further details are summarized in Table 1.

X. Example 9

1.8 kg of iron oxide black Bayferrox® 360 and 0.2 kg of carbon pigment (carbon black) Corax® N 660 (commercial product from Degussa AG) were thoroughly mixed in a mixer. Thereafter,
a) 5.0% by weight of a 20% strength aqueous solution of a partly hydrolysed polyvinyl alcohol having a relatively high molecular weight or
b) 2.0% by weight of neomere® TINT 308 and 2.0% by weight of a 25% strength aqueous solution of a partly hydrolysed polyvinyl alcohol having a low molecular weight were added and thorough mixing was again effected. The products obtained were incorporated as described above according to the building material colour test with a mixing time of 100 s. The bricks produced were homogeneously coloured and, in the colour measurement, gave a relative colour strength of 131% and 140%, respectively. The reference used was the likewise homogeneously coloured brick of Bayferrox® 360/Corax® N 660 mixture without additives. The black pigment/auxiliary combinations therefore have a substantially higher colour strength than the starting mixture. Further details are summarized in Table 1.

one or more inorganic black pigments selected from the group consisting of iron oxide black, iron-manganese mixed oxides, and spinel mixed-phase pigments; and one or more organic auxiliaries selected from the group consisting of modified carboxylates, polyvinyl acetates, copolymers of vinyl acetate, partly or completely hydrolysed polyvinyl alcohols, alkyl phosphates in the form of their alkali metal salts, alkyl phosphonates in the form of their alkali metal salts, alkyl sulphates in the form of their alkali metal salts, alkyl sulphonates in the form of their alkali metal salts, and mixtures thereof, wherein the organic auxiliaries are added in an amount of 0.01% by weight to 20% by weight calculated as active substance based on the amount of the inorganic black pigments present, wherein the black pigment/auxiliary combination results in a relative colour strength of $\geqq 110\%$, based on the amount of black pigment present according to a building material colour test, wherein said black pigment/auxiliary combination is produced by a process selected from the group consisting of spray granulation, fluidized-bed granulation and compaction granulation, and wherein said black pigment/auxiliary combination is in granule form and is homogeneous.

2. The black pigment/auxiliary combination according to claim 1, wherein the relative colour strength is $\geqq 112\%$.

3. The black pigment/auxiliary combination according to claim 1, wherein the black pigment/auxiliary combination has a residual water content of less than 5% by weight.

4. The black pigment/auxiliary combination according to claim 1, wherein the black pigment/auxiliary combination is present in the form of bead granules.

5. The black pigment/auxiliary combination according to claim 1, wherein at least 85% of the granulated black pigment/auxiliary combination has a particle size between 60 μm and 3000 μm.

6. The black pigment/auxiliary combination according to claim 1, wherein the organic auxiliaries are added in an

TABLE 1

| Example | 1a | 1b | 2a | 2b | 3(CE) | 4(CE) | 5 | 6 | 7a | 7b | 8a | 8b | 9a | 9b |
|---|---|---|---|---|---|---|---|---|---|---|---|---|---|---|
| $\Delta a^*$ | 0.0 | 0.2 | 0.1 | 0.2 | 0.0 | 0.0 | 0.0 | 0.1 | 0.3 | 0.2 | 0.2 | 0.1 | 0.1 | 0.1 |
| $\Delta b^*$ | −0.2 | 0.6 | 0.2 | 0.4 | 0.0 | 0.4 | 0.2 | 0.2 | 0.1 | 0.1 | 0.1 | 0.2 | 0.6 | 0.4 |
| $\Delta L^*$ | −2.6 | −3.1 | −2.0 | −2.5 | 0.4 | −0.5 | −1.3 | −2.4 | −4.0 | −3.6 | −3.3 | −2.6 | −2.6 | −3.3 |
| $\Delta C_{ab}^*$ | 0.1 | −0.1 | −0.1 | −0.2 | 0.0 | −0.3 | −0.1 | 0.0 | −0.3 | −0.1 | −0.2 | −0.2 | −0.4 | −0.3 |
| $\Delta E_{ab}^*$ | 2.6 | 3.1 | 2.0 | 2.6 | 0.4 | 0.6 | 1.3 | 2.4 | 4.0 | 3.6 | 3.3 | 2.6 | 2.7 | 3.3 |
| Relative colour strength (%) | 129 | 135 | 121 | 127 | 97 | 105 | 112 | 123 | 142 | 137 | 134 | 126 | 131 | 140 |
| Bulk density (g/cm$^3$) | 0.53 | 0.56 | 1.35 | 1.42 | 1.46 | 1.04 | 0.64 | 1.12 | 0.66 | 0.63 | 0.95 | 0.92 | 0.46 | 0.46 |
| Residual moisture (% by wt) | 0.4 | 1.7 | 0.4 | 0.4 | 0.6 | 0.4 | 0.4 | 0.5 | 0.2 | 0.2 | 0.3 | 0.2 | 1.4 | 0.9 |
| Solidification behaviour | fulfilled | fulfilled | fulfilled | fulfilled | fulfilled | not fulfilled | fulfilled | fulfilled | fulfilled | fulfilled | fulfilled | fulfilled | fulfilled | fulfilled |
| Compressive strength | n.d. | n.d. | n.d. | n.d. | n.d. | not fulfilled | fulfilled | fulfilled | n.d. | n.d. | fulfilled | fulfilled | fulfilled | fulfilled |
| pH (suspension) | — | — | 9.0 | 8.8 | 8.6 | 5.3 | — | 8.2 | — | — | 6.9 | 5.5 | — | — |

"n.d." in Table 1 denotes "not determined".

What is claimed is:

1. A black pigment/auxiliary combination consisting essentially of:

amount of 0.1% by weight to 5% by weight, calculated in each case as active substance based on the inorganic black pigments.

7. The black pigment/auxiliary combination according to claim 1, wherein the black pigment/auxiliary combination has a residual water content of less than 3% by weight.

8. The black pigment/auxiliary combination according to claim 1, wherein at least 85% of the granulated black pigment/auxiliary combination has a particle size between 80 µm and 1500 µm.

9. A process for the preparation of the black pigment/auxiliary combination according to claim 1, comprising:
   mixing the one or more inorganic black pigments in suspension or paste with one or more organic auxiliaries thereby forming a mixture, and
   drying the mixture by spray-drying or fluidized-bed drying.

10. The process according to claim 9, wherein the pigment suspension or paste is from the pigment preparation process.

11. The process for the preparation of the black pigment /auxiliary combination according to claim 9, wherein the pigment suspension or paste is a redispersion of agglomerated particles.

12. A process for colouring a lime- and/or a cement-bound building materials, comprising:
    mixing the black pigment/auxiliary combination according to claim 1 with the lime- and/or the cement-bound building materials.

13. A process for colouring building materials with the black pigment/auxiliary combination according to claim 1, comprising:
    mixing the black pigment/auxiliary combination with the building materials in an amount of 0.1 to 10% by weight, based on the building materials.

14. A process for colouring building materials with the black pigment/auxiliary combination according to claim 1, comprising:
    suspending in water the black pigment/auxiliary combination thereby forming a suspension, and
    subsequently, mixing the suspension with the building materials.

* * * * *